United States Patent
Robinson et al.

(10) Patent No.: US 7,539,423 B2
(45) Date of Patent: May 26, 2009

(54) LOSS OF SIGNAL DETECTION AND PROGRAMMABLE BEHAVIOR AFTER ERROR DETECTION

(75) Inventors: Michael A. Robinson, Fremont, CA (US); Gideon Z. Romm, Bronx, NY (US); Randall P. Clark, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 574 days.

(21) Appl. No.: 10/340,173

(22) Filed: Jan. 10, 2003

(65) Prior Publication Data

US 2004/0136421 A1 Jul. 15, 2004

(51) Int. Cl.
*H04B 10/04* (2006.01)

(52) U.S. Cl. ............... 398/197; 398/192; 398/182; 398/183; 398/193; 398/195; 398/202; 398/208; 398/135; 398/136; 372/38.02; 372/32; 372/34; 372/36

(58) Field of Classification Search ............ 398/197, 398/182, 183, 186, 192, 193, 194, 195, 196, 398/135, 136, 137, 138, 139, 128, 130, 119, 398/120, 202, 208, 209, 22, 23, 24; 372/38.02, 372/32, 34, 36
See application file for complete search history.

(56) References Cited

U.S. PATENT DOCUMENTS

| | | | |
|---|---|---|---|
| 4,449,248 A | 5/1984 | Leslie | |
| 5,095,308 A | 3/1992 | Hewitt | |
| 5,383,208 A | 1/1995 | Queniat et al. | |
| 5,631,636 A | 5/1997 | Bane | |
| 5,929,771 A | 7/1999 | Gaskill | |
| 6,597,898 B1 * | 7/2003 | Iwata et al. | 455/240.1 |
| 6,621,345 B2 * | 9/2003 | Matsugatani et al. | 330/281 |
| 6,668,329 B1 | 12/2003 | Rudd et al. | |
| 6,700,909 B2 * | 3/2004 | Tsai | 372/38.01 |
| 6,735,228 B2 * | 5/2004 | Tsai | 372/38.02 |
| 6,798,286 B2 * | 9/2004 | Dauphinee et al. | 330/129 |
| 6,904,102 B2 | 6/2005 | Porcino | |
| 7,050,720 B2 | 5/2006 | Aronson | |
| 7,269,357 B2 * | 9/2007 | Case et al. | 398/135 |
| 2002/0114363 A1 | 8/2002 | Everett | |
| 2003/0110509 A1 * | 6/2003 | Levinson et al. | 725/121 |
| 2007/0031153 A1 * | 2/2007 | Aronson et al. | 398/138 |

FOREIGN PATENT DOCUMENTS

| | | |
|---|---|---|
| JP | 06216793 | 8/1994 |
| WO | WO02/063880 A1 | 8/2002 |

* cited by examiner

*Primary Examiner*—Hanh Phan (57) ABSTRACT

A method for a fiber optic device to conserve power includes turning off components in the fiber optic device and turning them back on when a detection signal is at a specified level. A method for a laser system to adjust a threshold level for signal detection includes generating a digital gain signal, amplifying at least one data signal with a gain based on the gain signal, comparing the at least one amplified data signal with a reference signal, and generating a signal based on the comparison. A method for a laser system to set error warnings includes receiving control bits that indicate if a host desires to be notified of certain error conditions and generating at least one signal based on the control bits to indicate at least one error condition.

10 Claims, 9 Drawing Sheets

LOSS OF SIGNAL DETECTION AND PROGRAMMABLE BEHAVIOR AFTER ERROR DETECTION

FIELD OF INVENTION

This invention relates to error detection in laser transmitters, receivers, and transceivers.

DESCRIPTION OF RELATED ART

Laser transceivers are commonly used to transmit and receive data in optical networks. Error detection is vital to ensure that malfunctions in the laser transceivers are quickly identified and repaired so that communication is not interrupted. Thus, what are needed are methods and apparatuses that enhance error detection in the laser transceivers.

SUMMARY

In accordance with one aspect of the invention, a method for a laser system to conserve power includes turning off components in the laser system, detecting a data signal after a duration of time, and generating a detection signal in response to the detecting. The detection signal can be a loss of signal (LOS) signal or a signal detect (SD) signal. The method further includes repeat the turning off, the detecting, and the generating when the detection signal is at a first level, and turning on the plurality of components when the detection signal is at a second level.

In accordance with one aspect of the invention, a method for a laser system to adjust a threshold level for signal detection includes generating a digital gain signal, amplifying at least one data signal with a gain based on the gain signal, comparing the at least one amplified data signal with a reference signal, and generating a detection signal based on the comparison. The method further includes adjusting the gain signal based on the comparison of the at least one amplified data signal, comparing the value of the gain signal with at least a second reference signal, and generating the detection signal based on the comparison of the value of the gain signal. The method further includes setting a control bit to generating the signal as a loss of signal or a signal detect signal.

In accordance with one aspect of the invention, a method for a laser system to set error warnings includes receiving control bits that indicate if the host desires to be notified of certain error conditions, detecting occurrences of the error conditions, writing error bits based on the detected occurrences of the error conditions, performing a logical operation between the corresponding control bits and error bits, and generating at least one signal based on the result of the logical operation to the host to indicate at least one error condition.

DETAILED DESCRIPTION

Figure 1:
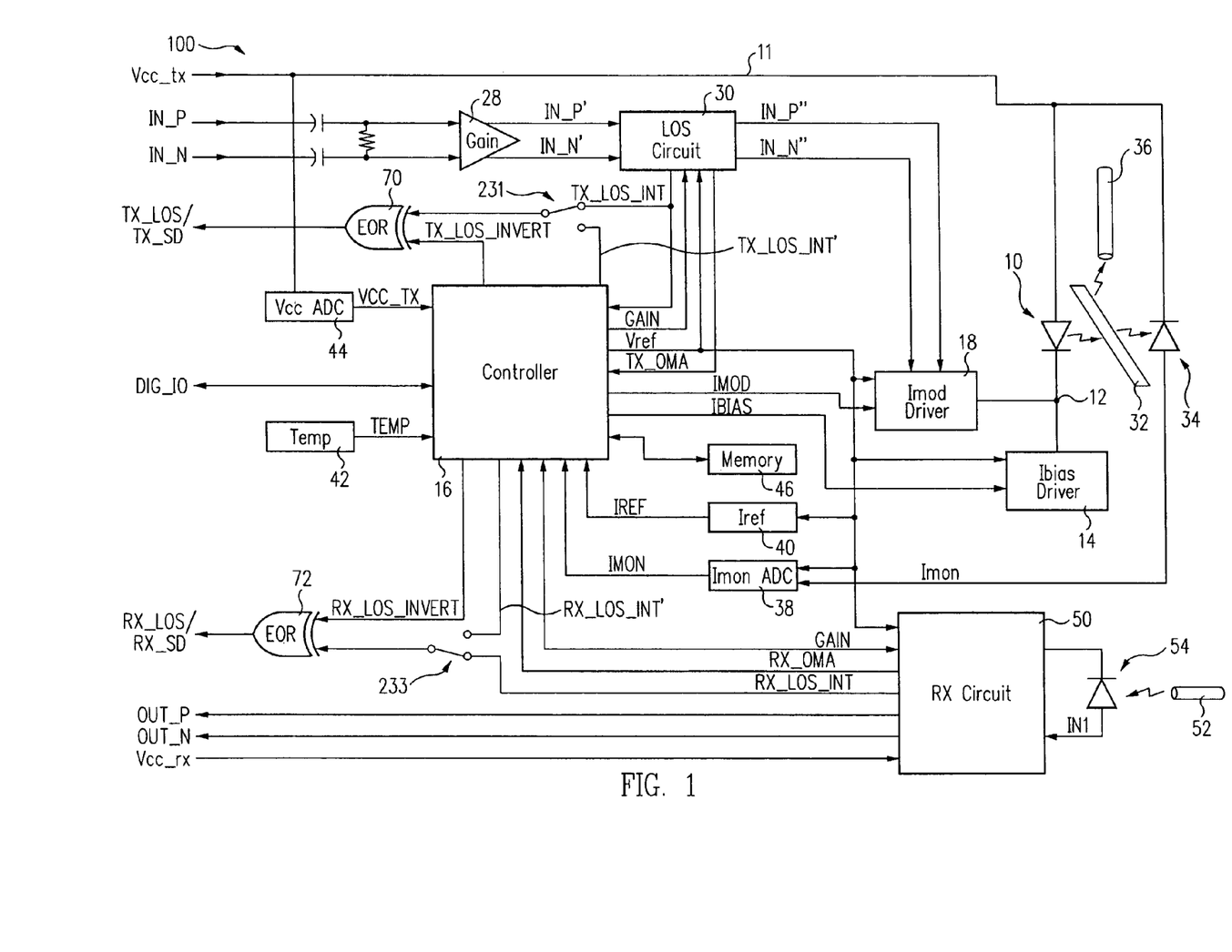
FIG. 1 is a schematic of a laser system in one embodiment of the invention.

FIG. 1 illustrates a laser system 100 (e.g., a laser transceiver) in one embodiment of the invention. The anode of a laser 10 (e.g., a laser diode) is connected to a supply rail 11 that provides a power supply voltage Vcc_tx. The cathode of laser diode 10 is connected at a node 12 to an Ibias driver 14 that sinks a constant current Ibias from laser diode 10. A controller 16 sets the magnitude of current Ibias by outputting a control signal IBIAS to driver 14. Control signal IBIAS can be an analog signal or a digital signal having multiple bits.

The cathode of laser diode 10 is also connected at node 12 to an Imod driver 18 that sinks a modulation current Imod from laser diode 10. Controller 16 sets the magnitude of current Imod by outputting a control signal IMOD to driver 18. Control signal IMOD can be an analog signal or a digital signal having multiple bits. The drive current applied to laser diode 10 is either current Ibias or the sum of currents Ibias and Imod.

Figure 2:
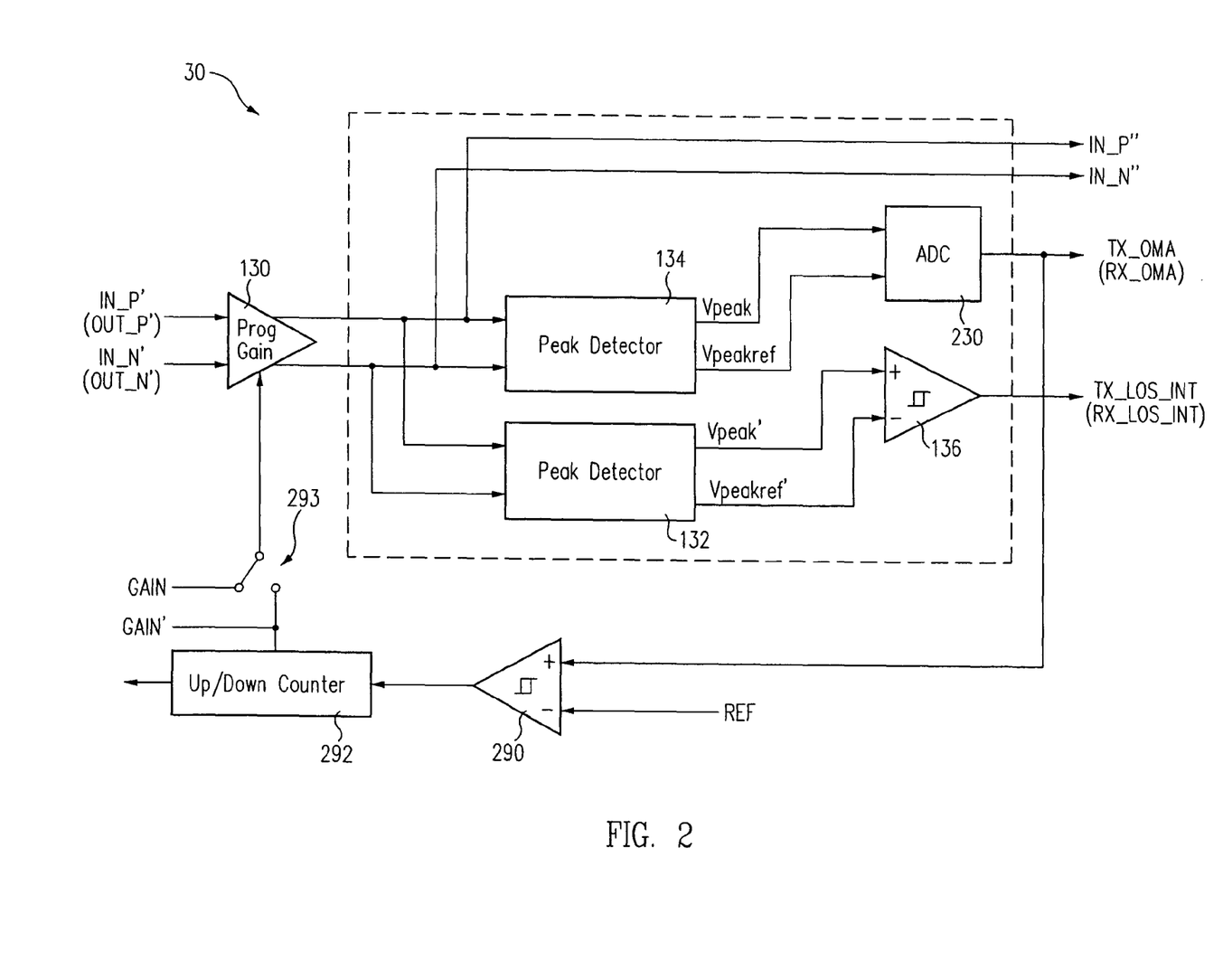
FIG. 2 is a schematic of an LOS (loss of signal) circuit in the laser system of FIG. 1 in one embodiment.

An amplifier 28 receives data signal IN_P and its complement IN_N to be transmitted by laser diode 10. In response, amplifier 28 outputs amplified signals IN_P' and IN_N' to an LOS (loss of signal detection) circuit 30. FIG. 2 illustrates on embodiment of LOS circuit 30. LOS circuit 30 outputs signals IN_P' and IN_N' as control signals IN_P'' and IN_N'' to driver 18. LOS circuit 30 also outputs a signal TX_LOS_INT when signals IN_P' and IN_N' are not detected because their amplitudes are below a threshold. The purpose and operation of LOS circuit 30 are described later in one aspect of the invention.

A mirror 32 reflects a part of the light signal from laser diode 10 to a light detector 34 (e.g., a photodiode) and transmits a part of the light signal to a fiber 36 that carries the light signal to another component. Photodiode 34 is connected between supply rail 11 and an Imon ADC (analog-to-digital converter) 38. Photodiode 34 outputs an analog signal Imon to Imon ADC 38. Analog signal Imon is proportional to the reflected power received by photodiode 34. The reflected power is proportional to the transmitted power received by fiber 36 and the total output power of laser diode 10. Imon ADC 38 outputs a digital signal IMON to controller 16.

An Iref source 40 outputs a reference signal IREF to controller 16. Reference signal IREF can be either digital or analog. Controller 16 typically compares signals IREF and IMON to control laser diode 10 in a closed feedback loop.

A temperature sensor 42 outputs a signal TEMP to controller 16. Signal TEMP can be either digital or analog. Signal TEMP is proportional to the temperature of laser system 100.

A Vcc ADC 44 is connected to supply rail 11 and outputs a digital signal VCC_TX to controller 16. Signal VCC_TX is proportional to supply voltage Vcc_tx supplied to laser diode 10.

A memory 46 outputs parameters for calibrating laser system 100 to controller 16. Controller 16 communicates with a host on a bus DIG_IO. The host can be an external processor, computer, or a test equipment. Memory 46 may be a programmable nonvolatile memory such as an EEPROM.

Laser system 100 may include an RX circuit 50 that decodes a light signal received from a fiber 52. A light detector 54 (e.g., a photodiode) converts the light signal to an analog current signal IN1. RX circuit 50 converts signal IN1 to a voltage data signal OUT_P and its complement OUT_N. RX circuit 50 also outputs a signal RX_LOSS_INT when the data signals are not detected because their amplitudes are below a threshold.

Figure 3:
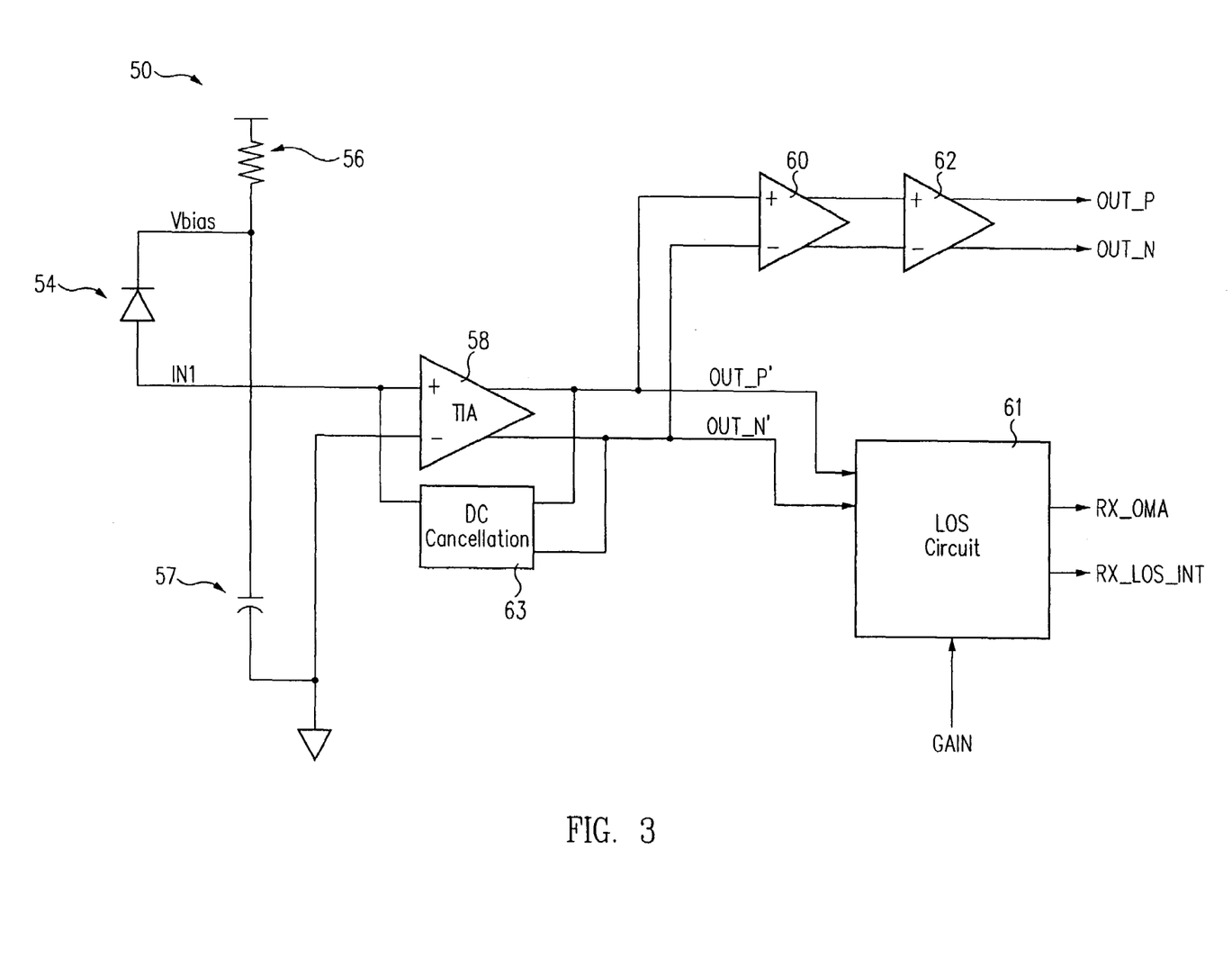
FIG. 3 is a schematic of an RX (receiver) circuit in the laser system of FIG. 1 in one embodiment.

FIG. 3 illustrates one embodiment of RX circuit 50. A resistor 56 and a capacitor 57 form an RC filter that provides a filtered voltage Vbias to photodiode 54. Photodiode 54 outputs signal IN1 to a non-inverted terminal of a transimpedance amplifier (TIA) 58. TIA 58 has a inverted terminal coupled to the ground as a reference.

TIA 58 converts current signal IN1 to a voltage signal OUT_P' and its complement OUT_N'. TIA 58 outputs signals OUT_P' and OUT_N' to an amplifier 60 and a LOS circuit 61. Amplifier 60 outputs amplified signal OUT_P and its complement OUT_N to the host. Additional gain stages 62 may be used to further amplify signals OUT_P and OUT_N.

LOS circuit 61 outputs a signal RX_LOS_INT when signals OUT_P' and OUT_N' are not detected because their amplitudes are below a threshold. LOS circuit 61 can be similarly constructed as LOS circuit 30 as shown in FIG. 2 where the signals to and from circuit 61 are shown in parenthesis. The purpose and operation of LOS circuit 61 are described later in one aspect of the invention.

TIA 58 includes a DC cancellation circuit 63 that feeds back a DC cancellation current into the non-inverted terminal of amplifier 58. The DC cancellation current is proportional to the average optical power of the light signal received by photodiode 54.

In accordance with one aspect of the invention, a host can set a control bit to determine whether laser system 100 generates a LOS or a SD (signal detect) signal. As described above, the LOS signal indicates that the data signals are not detected because their amplitudes are below a threshold. The SD signal is the complement of the LOS signal. The SD signal indicates that the data signals are detected because their amplitudes are above a threshold. Some applications of laser system 100 may prefer the LOS signal while others may prefer the SD signal.

Referring back to FIG. 1, the host can set a control bit in a register or in memory 46 to indicate its preference for the LOS or the SD signal from LOS circuit 30. Controller 16 can read the control bit and generate a control signal TX_LOS_INVERT that controls if LOS circuit 30 generates the LOS or the SD signal. Alternatively, the register can directly output control signal TX_LOS_INVERT. A logic gate 70 (e.g., an exclusive OR gate) receives signals TX_LOS_INT and TX_LOS_INVERT. If control signal TX_LOS_INVERT is low, gate 70 generates the LOS signal (e.g., a signal TX_LOS). If control signal TX_LOS_INVERT is high, gate 70 generates the SD signal (e.g., a signal TX_SD).

Similarly, the host can set a control bit that indicates its preference of the LOS or the SD signal from LOS circuit 61 (FIG. 3) in RX circuit 50. A logic gate 72 (e.g., an exclusive OR gate) receives signals RX_LOS_INT and RX_LOS_INVERT. If control signal RX_LOS_INVERT is low, gate 72 generates the LOS signal (e.g., a signal RX_LOS). If control signal RX_LOS_INVERT is high, gate 72 generates the SD signal (e.g., a signal RX_SD).

Figure 4:
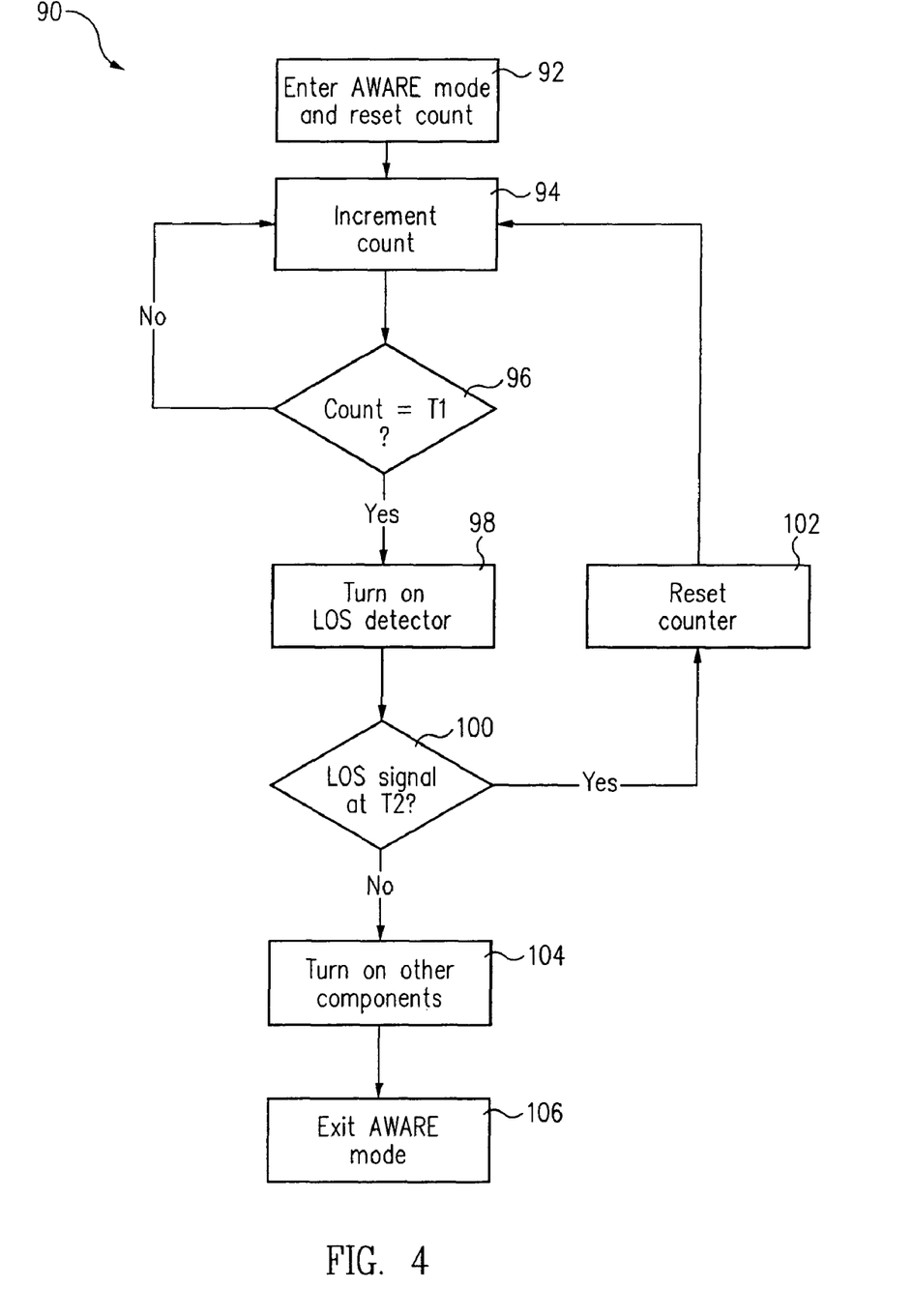
FIG. 4 is a flow chart of a method for the laser system of FIG. 1 to conserve power.

In accordance with one aspect of the invention, laser system 100 can be brought out of a sleep mode by periodically checking for an incoming data signal and bringing laser system 100 out of the sleep mode when the incoming data signal is detected. FIG. 4 is a flow chart of a method 90 for bringing laser system 100 out of the sleep mode in one embodiment.

In step 92, controller 16 puts laser system 100 in an AWARE (Awake on Remote Event) mode and clears a count. Controller 16 does so in response to a host command or when data signals have not been received by either LOS circuit 30 or 61 over a period of time. In the AWARE mode, laser system 100 conserves power by turning off the current sources in laser system 100. Controller 16 can turn off the various current sources by blocking the reference voltages (e.g., collectively shown as reference voltage Vref in FIG. 1) to the current sources. For example, current sources in Ibias driver 14, Imod drive 18, and LOS circuits 30 and 61 can be turned off.

In step 94, controller 16 increments the count. Controller 16 can perform the actual counting or use a counter.

In step 96, controller 16 determines if a specific time T1 has passed. If so, step 96 is followed by step 98. If time T1 has not passed, then step 96 loops back to step 94 where the count is continued.

In step 98, controller 16 turns on LOS circuit 30 (FIG. 1) and/or LOS circuit 61 (FIG. 3) for a specific time T2 to check for any incoming data signals.

In step 100, controller 16 determines if either LOS circuit 30 or 61 detects an incoming data signal at time T2. If so, step 100 is followed by 104. If neither LOS circuit 30 or 61 detects an incoming data signal at time T2, step 100 is followed by step 102.

In step 102, controller 16 resets the count. Step 102 is followed by step 94 and method 90 repeats until an incoming data signal has been detected.

In step 104, controller 16 turns on the current sources in laser system 100 by providing them with their reference voltages.

In step 106, controller 16 exits the AWARE mode.

In accordance with one aspect of the invention, LOS threshold levels can be adjusted digitally. Referring back to FIG. 2, LOS circuit 30 includes a programmable amplifier 130 that has a control terminal receiving a control signal GAIN from controller 16. Programmable amplifier 130 also has input terminals that receive data signals IN_P and IN_N. Programmable amplifier 130 amplifies signals IN_P and IN_N with a gain set by control signal GAIN and outputs the data signals as signals IN_P' and IN_N'.

Peak detectors 132 and 134 are each coupled to receive signals OUT_P' and OUT_N'. Peak detector 132 outputs an analog signal Vpeak' that is proportional to the peak level of signals OUT_P' and OUT_N'. Peak detector 132 also outputs a reference signal Vpeakref' derived from signals OUT_P' and OUT_N'. Peak detector 132 shifts signal Vpeak' down by an offset such that without any input signals, signal Vpeak' is offset below signal Vpeakref'. Similarly peak detector 134 outputs signals Vpeak and Vpeakref but without the offset.

A comparator 136 with hysteresis circuitry compares signals Vpeak' and Vpeakref'. When Vpeak' is less than signal Vpeakref', comparator 136 brings a signal TX_LOS_INT high.

Figure 5:
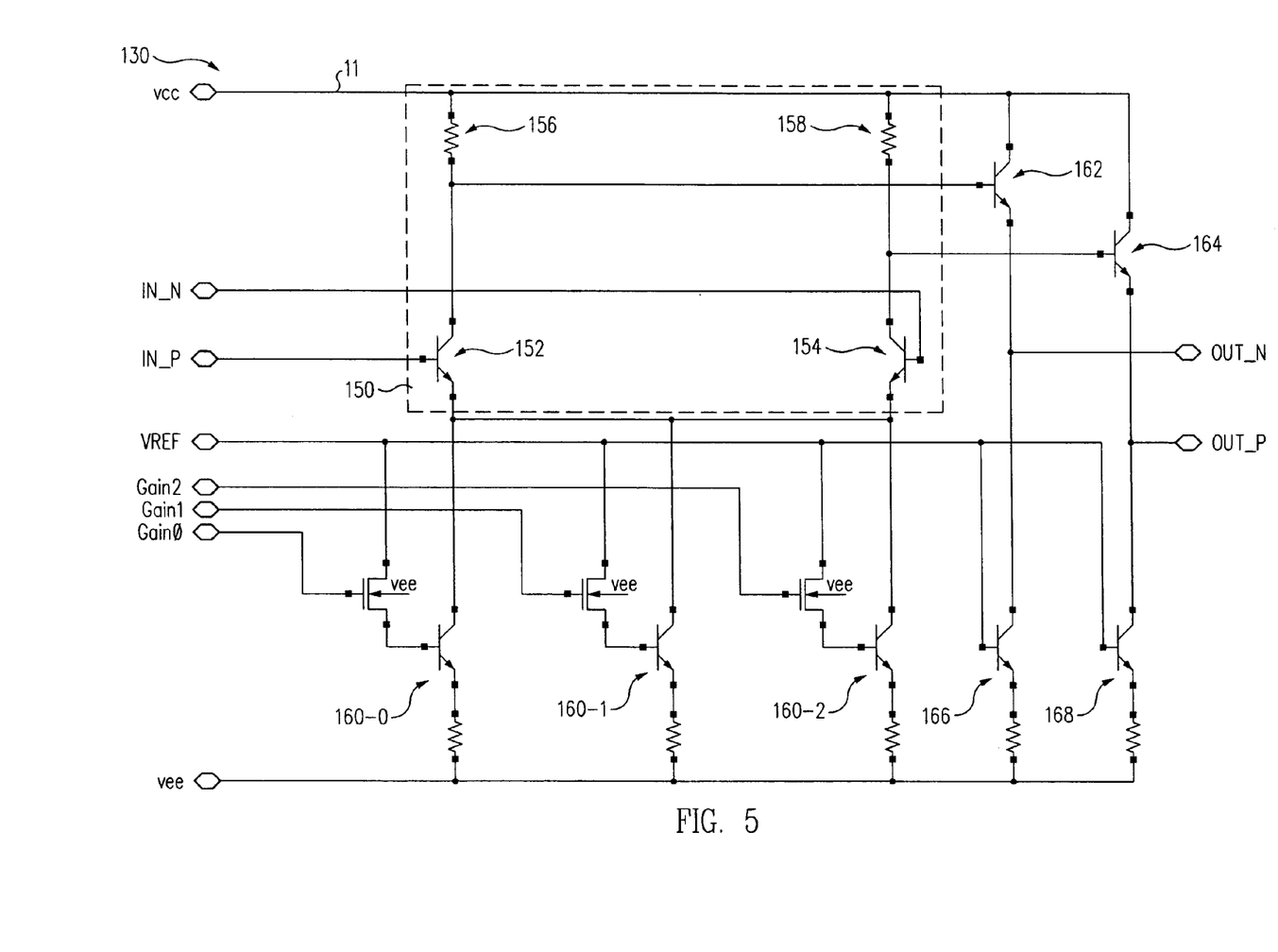
FIG. 5 is a schematic of a programmable amplifier in the LOS circuit of FIG. 2 in one embodiment.

FIG. 5 illustrates one embodiment of programmable amplifier 130. Amplifier 130 includes a differential gain stage 150. Stage 150 includes bipolar transistors 152 and 154 having their collector terminals coupled by resistors 156 and 158 to supply rail 11, respectively. The output voltages of stage 150 are set by the number of current sources 160-0 to 160-2 that are coupled in parallel to sink a current from the emitter terminals of transistors 152 and 154. Current sources 160-0 to 160-2 can be individual turned on by corresponding control signals GAIN0 to GAIN2 (collectively referred to as "control signal GAIN"). The output voltages of stage 150 are level-shifted by bipolar transistors 162 and 164. Transistors 162 and 164 have their collector terminals connected to supply rail 11 and their emitter terminals connected to current sources 166 and 168, respectively.

Figure 6:
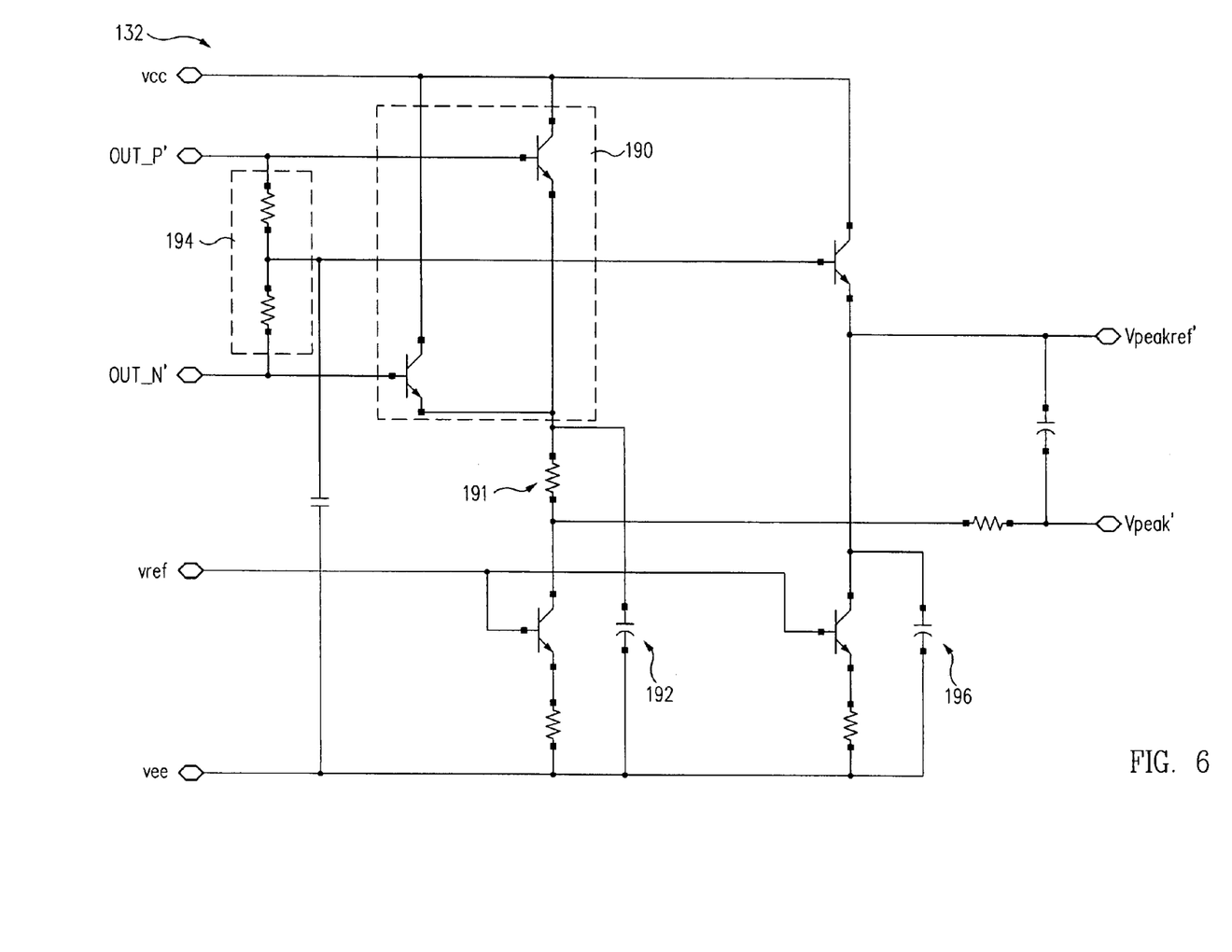
FIG. 6 is a schematic of a peak detector in the LOS circuit of FIG. 2 in one embodiment.

FIG. 6 illustrates one embodiment of peak detector 132. Peak detector 132 includes a differential pair 190 that selectively passes signals OUT_P' and OUT_N' to a holding capacitor 192. Holding capacitor 192 captures the highest voltage output from differential pair 190, which is the peak voltage of signals OUT_P' and OUT_N' level-shifted one base emitter junction voltage drop. The peak voltage, minus a voltage drop across a resistor 191, is provided as signal Vpeak'. The voltage drop across resistor 191 provides an offset by which signal Vpeak' will be less than reference signal Vpeakref' to generate a LOS condition unless sufficient input signals are present such that Vpeak' is greater Vpeakref'.

A voltage divider 194 is coupled between the lines that carry signals OUT_P' and OUT_N'. Voltage divider 194 outputs the average of their voltages to a holding capacitor 196. Holding capacitor 196 captures the highest voltage output from voltage divider 194 level-shifted one base emitter junction voltage drop, which is provided as reference signal Vpeakref'. Signal Vpeakref' represents the DC level of the input signals.

Peak detector 134 is similarly constructed as peak detector 132 but may not include resistor 191 that provides the voltage offset. This is because peak detector 134 is used with an ADC 230 (described later) to determine a digital representation of the optical modulation amplitude (OMA) of signals OUT_P' and OUT_N'.

Figure 7:
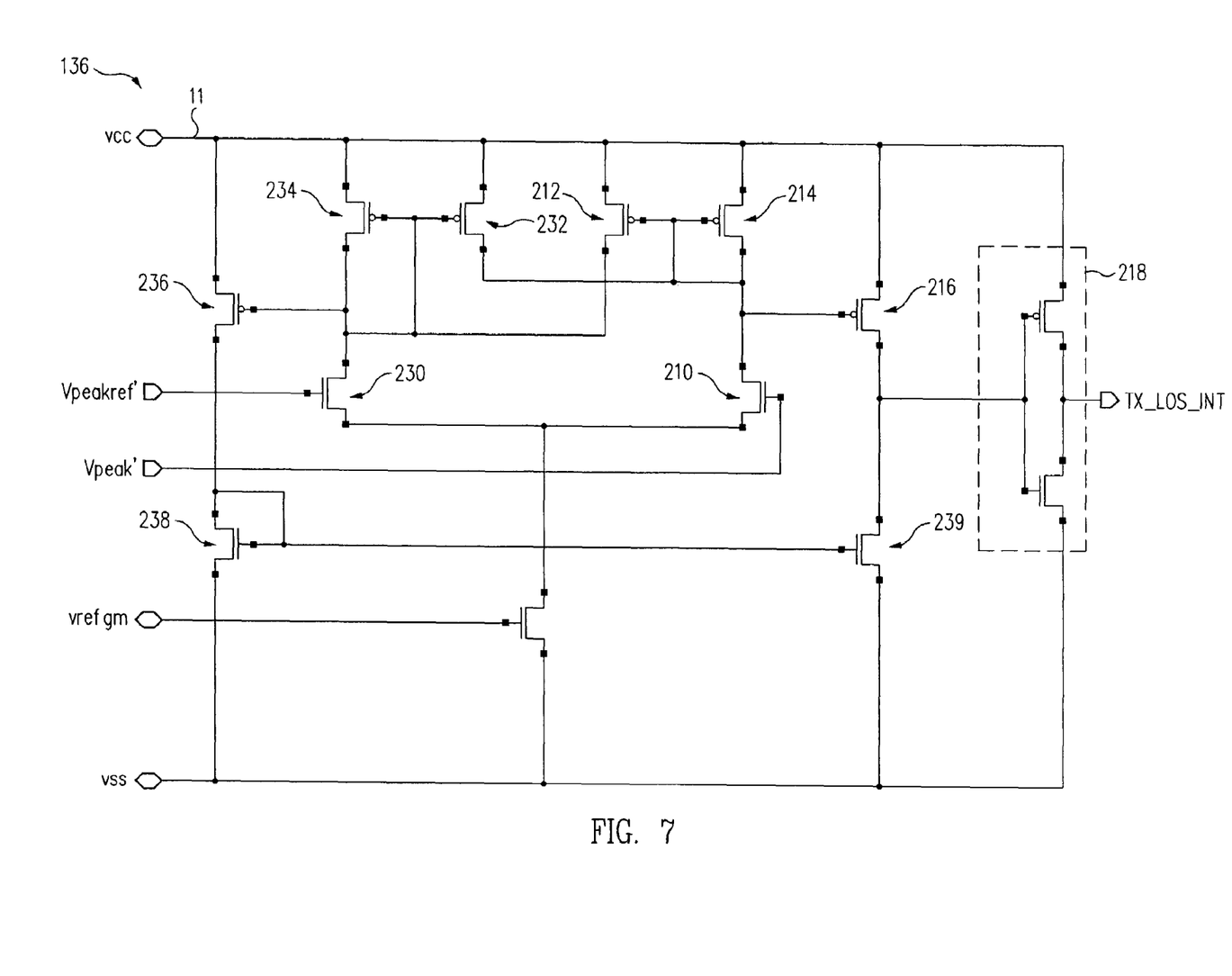
FIG. 7 is a schematic of a comparator with hysteresis in the LOS circuit of FIG. 2 in one embodiment.

FIG. 7 illustrates one embodiment of hysteresis comparator 136. When voltage signal Vpeak' is larger than voltage signal Vpeakref' by a hysteresis amount, NMOS transistor 210 is turned on to pull low the gate terminals of PMOS transistors 212, 214, and 216. This causes transistor 216 to turn on and couple supply rail 11 to the input terminal of an inverter 218. Thus, inverter 218 generates a low signal TX_LOS_INT when voltage signal Vpeak' is larger than Vpeakref'.

When voltage signal Vpeak' is less than Vpeakref' by a hysteresis amount, NMOS transistor 230 is turned onto pull low the gate terminals of PMOS transistors 232, 234, and 236. This causes transistor 236 to turn on and couple supply rail 11 to the gate terminals NMOS transistors 238 and 239. This causes transistor 239 to turn on and ground the input terminal of inverter 218. Thus, inverter 218 generates a high signal TX_LOS_INT when voltage signal Vpeak' is less than Vpeakref'. Transistors 212 and 232 provide hysteresis to prevent oscillation of signal TX_LOX_INT.

Instead of comparator 136, ADC 230 (FIG. 2) can be used to determine if signal TX_LOS_INT should be generated. ADC 230 has an input terminal receiving analog voltage signal Vpeak and a reference terminal receiving reference signal Vpeakref. ADC 230 converts the analog input signal to a digital signal TX_OMA, which corresponds to the peak level of data signals IN_P and IN_N. Controller 16 then compares the value of digital signal TX_OMA with two reference signals for hysteresis purposes. If signal TX_OMA is greater than a first reference signal, then controller 16 generates a low signal TX_LOS_INT'. If signal TX_OMA is less than a second reference signal, then controller 16 generates a high signal TX_LOS_INT'. Controller 16 then uses a switch 231 (FIG. 1) to pass signal TX_LOS_INT' instead of signal TX_LOS_INT as an input to gate 70.

Controller 16 can use an ADC in LOS circuit 61 in RX circuit 50 as described above. Controller 16 generates a signal RX_LOS_INT' after comparing the value of digital signal RX_OMA with reference signals. Controller 16 uses a switch 233 (FIG. 1) to pass signal RX_LOS_INT' instead of signal RX_LOS_INT as an input to gate 72.

Figure 8:
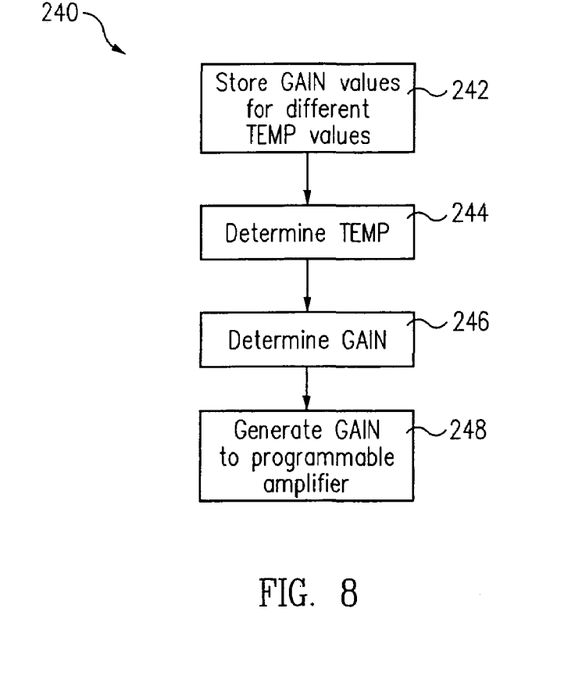
FIG. 8 is a flow chart of a method for the laser system of FIG. 1 to adjust the LOS threshold level.

In accordance with one aspect of the invention, the LOS threshold level can be adjusted according to the temperature of laser system 100. FIG. 8 is a flow chart of a method 240 for controller 16 to adjust the LOS threshold level in one embodiment. Method 240 is explained with reference to LOS circuit 30 but it is also applicable to LOS circuit 61.

In step 242, values of control signal GAIN for a range of temperatures are stored in a table in memory 46. The values are experimentally determined to generate a constant LOS threshold level over different temperatures. Instead of the table, a function correlating the values of control signal GAIN to different temperatures can be extrapolated from experimental data and stored in memory 46.

In step 244, controller 16 determines the temperature of laser diode 10 by reading signal TEMP from temperature sensor 42.

In step 246, controller 16 determines a value of control signal GAIN at the present temperature. Controller 16 can look up the value of control signal GAIN in the table in memory 46. Alternatively, controller 16 can calculate the value of control signal GAIN at the present temperature using the function extrapolated from experimental data.

In step 248, controller 16 generates control signal GAIN to amplifier 130.

Figure 9:
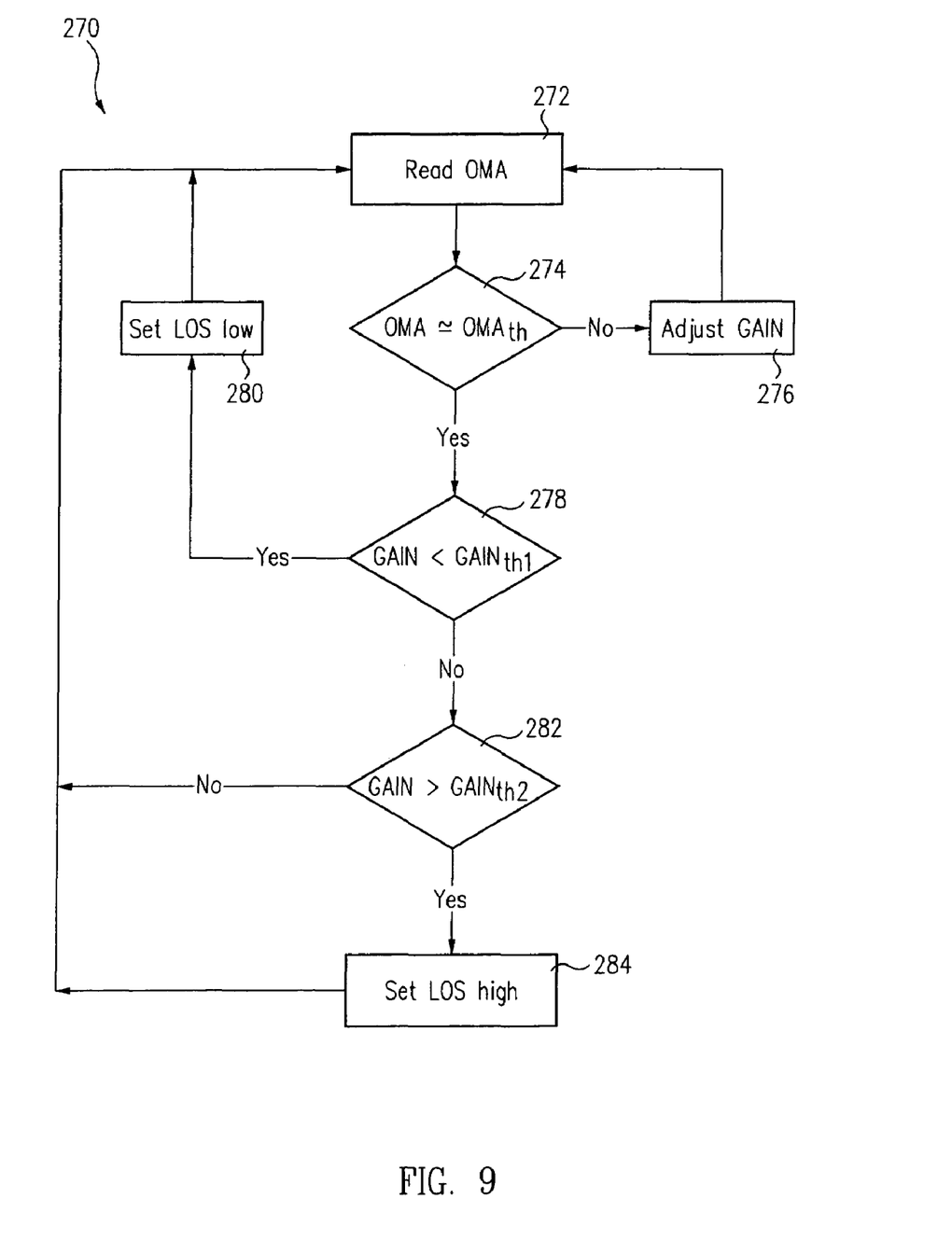
FIG. 9 is a flow chart of a method for the laser system of FIG. 1 to generate a LOS signal using a closed feedback loop.

In accordance with one aspect of the invention, LOS detection can be performed using a closed feedback loop where signal GAIN is adjusted to maintain a constant output of LOS ADC 230 and the value of signal GAIN is compared with one or more reference signals to determine if any data signals are detected. FIG. 9 is a flow chart of a method 270 for controller 16 to generate a LOS signal using a closed feedback loop in one embodiment. Method 270 is explained with reference to LOS circuit 30 but it is also applicable to LOS circuit 61.

In step 272, controller 16 reads signal TX_OMA from LOS circuit 30.

In step 274, controller 16 determines if signal TX_OMA is approximately equal to a threshold OMAth. If not, step 274 is followed by step 276. If signal TX_OMA is approximately equal to threshold OMAth, then step 274 is followed by step 278.

In step 276, controller 16 adjusts the value of signal GAIN so ADC 230 generates a constant output. If signal TX_OMA is less than threshold OMAth, then controller 16 increases signal GAIN, and vice versa. Step 276 loops back to step 272.

In step 278, controller 16 determines if the value of signal GAIN is less than a threshold GAINth1. If so, step 278 is followed by step 280. If signal GAIN is not less than threshold GAINth1, step 278 is followed by step 282.

In step 280, controller 16 sets signal TX_LOS_INT low if it had been set high because the data signals are detected. Step 280 is followed by step 272 and method 270 repeats.

In step 282, controller 16 determines if the value of signal GAIN is greater than a threshold GAINth2. If so, step 282 is followed by step 284. If signal GAIN is not greater than threshold GAINth2, step 282 is followed by step 272 and method 270 repeats. By comparing signal GAIN against different thresholds in steps 278 and 282, hysteresis is provided in method 270.

In step 284, controller 16 sets signal TX_LOS_INT high if it had been set low because the data signals are not detected. Step 284 is followed by step 272 and method 270 repeats.

Referring back to FIG. 2, a comparator 290 and a counter 292 are used in a closed feedback loop. Comparator 290 compares signal TX_OMA with a reference signal REF and provides an output signal to counter 292. Counter 292 periodically increments or decrements a count depending on the output signal. A switch 293 provides the count as a signal GAIN' to programmable amplifier 130. Controller 16 again compares signal GAIN' to one or more reference signals to determine whether or not to set signal TX_LOS_INT' high.

Figure 10:
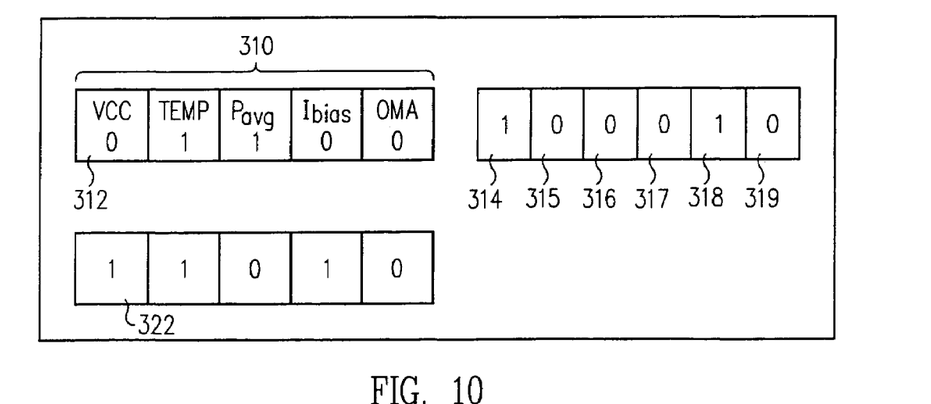
FIG. 10 illustrates an interrupt mask used to control error detection in one embodiment.

In accordance with one aspect of the invention, a programmable interrupt mask is used to allow the host to determine which alarms and what warning levels are to be used by laser system 100. FIG. 10 illustrates an interrupt mask 310 that the host can write control bits through bus DIG_IO. Each control bit can set an alarm for a specific type of error. For example, a control bit 312 controls whether or not the host will receive an alarm when the supply voltage level is too low or too high. Other error conditions include laser diode temperature, power levels, and laser current. Furthermore, one or more control bits can set the threshold level for a specific type of error. For example, control bits 314 to 316 set the maximum value of the supply voltage while control bits 317 to 319 set the minimum value of the supply voltage.

When errors are detected, controller 16 writes error bits. For example error bit 322 corresponds to an alarm for the supply voltage. Controller 16 performs a logic operation (e.g., an OR or an AND operation) between the corresponding control bits and error bits to determine whether or not the host should be informed of the error. If the host desires to be informed, controller 16 can output an interrupt signal on bus DIG_IO. Control bits and error bits can be written in physical registers in laser system 100 or specific memory locations in memory 46.

Various other adaptations and combinations of features of the embodiments disclosed are within the scope of the invention. Numerous embodiments are encompassed by the following claims.

What is claimed is:

1. A method for a laser system to adjust a threshold level for signal detection, comprising:
    generating a digital gain signal;
    amplifying at least one data signal with a gain corresponding to the digital gain signal;
    providing the at least one amplified data signal to a driver for a laser;
    comparing the at least one amplified data signal with at least a first reference signal;
    adjusting a value of the digital gain signal based on said comparing the at least one amplified data signal;
    comparing the value of the digital gain signal with at least a second reference signal;
    generating a comparison signal based on said comparing the value of the digital gain signal, wherein the comparison signal is selected from the group consisting of a loss of signal (LOS) signal and a signal detect (SD) signal; and
    outputting the comparison signal from the system.

2. The method of claim 1, wherein said generating a comparison signal comprises:
    changing the comparison signal to a first level when the digital gain signal is less than the second reference signal; and
    changing the comparison signal to a second level when the digital gain signal is greater than a third reference signal.

3. A method for a laser system to adjust a threshold level for signal detection comprising:
    generating a digital gain signal;
    amplifying at least one data signal with a gain corresponding to the digital gain signal;
    providing the at least one amplified data signal to a driver for a laser;
    adjusting a value of the digital gain signal based on comparing the at least one amplified data signal against first and second reference signals, said adjusting comprising:
        increasing the value of the digital gain signal when the at least one amplified data signal is less than the first reference signal; and
        decrementing the value of the digital gain signal when the at least one amplified data signal is greater than the second reference signal;
    comparing the value of the digital gain signal with at least a third reference signal;
    generating a comparison signal based on said comparing the value of the digital gain signal, wherein the comparison signal is selected from the group consisting of a loss of signal (LOS) signal and a signal detect (SD) signal; and
    outputting the comparison signal from the system.

4. A method for a laser system to adjust a threshold level for signal detection, comprising:
    generating a digital gain signal;
    amplifying at least one data signal with a gain corresponding to the digital gain signal; and
    comparing the at least one amplified data signal with at least one reference signal, said comparing comprising:
        generating a level signal corresponding to a level of the at least one amplified data signal;
        comparing the level signal with the at least one reference signal; and
        generating a comparison signal based on said comparing the level signal,
        wherein the comparison signal is selected from the group consisting of a loss of signal (LOS) signal and a signal detect (SD) signal;
        setting a logical level of a control bit in the laser system to select signal sensing in the laser system from the group consisting of LOS sensing and SD sensing;
        performing a logic operation between the comparison signal and the control bit to select the type of signal sensing.

5. A laser system, comprising:
    a programmable gain amplifier having at least one input terminal receiving at least one data signal, the programmable gain amplifier further having at least one control terminal receiving at least one digital gain signal, the programmable gain amplifier outputting at least one amplified data signal with a gain based on the at least one digital gain signal;
    a signal detection circuit having at least one input terminal receiving the at least one amplified data signal, the signal detection circuit generating at least one level signal corresponding to a level of the at least one data signal;
    a comparator having at least one input terminal receiving the at least one level signal, the comparator outputting a first signal based on the at least one level signal, wherein the first signal is selected from the group consisting of a first loss of signal (LOS) signal and a first signal detect (SD) signal;
    a counter receiving the first signal, the counter periodically adjusting a count signal based on the first signal, the counter generating the count signal as the digital gain signal to the programmable gain amplifier; and
    a controller receiving the digital gain signal, the controller comparing the digital gain signal with at least one reference signal, the controller generating a second signal based on the comparison of the digital gain signal, wherein the second signal is selected from the group consisting of a second LOS and a second SD signal.

6. The laser system of claim 5, wherein the at least one level signal corresponds to a peak level of the at least one amplified data signal.

7. The laser system of claim 5, wherein the signal detection circuit comprises:
   a peak detector having at least one input terminal receiving the at least one amplified data signal, the signal level detector outputting an analog level signal; and
   an analog-to-digital converter (ADC) having at least one input terminal receiving the analog level signal, the ADC outputting a digital level signal.

8. A laser system, comprising:
   a programmable gain amplifier having at least one input terminal receiving at least one data signal, the programmable gain amplifier further having at least one control terminal receiving at least one digital gain signal, the programmable gain amplifier outputting at least one amplified data signal with a gain based on the at least one digital gain signal;
   a signal detection circuit having at least one input terminal receiving the at least one amplified data signal, the signal detection circuit generating at least one level signal corresponding to a level of the at least one data signal;
   a comparator having at least one input terminal receiving the at least one level signal, the comparator outputting a comparison signal based on a comparison of the at least one level signal and a reference signal, wherein the comparison signal is selected from the group consisting of a loss of signal (LOS) signal and a signal detect (SD) signal;
   a control bit source outputting a control signal, the control signal setting signal sensing in the laser system selected from the group consisting of LOS sensing and SD sensing; and
   a logic gate having a first input terminal coupled to receive the comparison signal and a second input terminal coupled to receive the control signal, the logic gate performing a logic operation between the comparison signal and the control bit to select the type of signal sensing.

9. The laser system of claim 8, wherein the control bit source is a register.

10. The laser system of claim 8, wherein the control bit source is a controller.

* * * * *

UNITED STATES PATENT AND TRADEMARK OFFICE
CERTIFICATE OF CORRECTION

PATENT NO. : 7,539,423 B2  
APPLICATION NO. : 10/340173  
DATED : May 26, 2009  
INVENTOR(S) : Mike Robinson et al.

Page 1 of 1

It is certified that error appears in the above-identified patent and that said Letters Patent is hereby corrected as shown below:

Column 7, Line 64, Claim 3, delete "detection" and insert --detection,--.

Signed and Sealed this
Twenty-fifth Day of September, 2012

David J. Kappos
*Director of the United States Patent and Trademark Office*